(12) United States Patent
Shih (10) Patent No.: US 8,333,536 B2
(45) Date of Patent: Dec. 18, 2012

(54) MULTI-SPINDLE MACHINING MACHINE

(75) Inventor: Cheng Hsiu Shih, Taichung (TW)

(73) Assignee: Shenq Fang Yuan Technology Co., Ltd., Taichung (TW)

( * ) Notice: Subject to any disclaimer, the term of this patent is extended or adjusted under 35 U.S.C. 154(b) by 726 days.

(21) Appl. No.: 12/576,968

(22) Filed: Oct. 9, 2009

(65) Prior Publication Data

US 2011/0085863 A1    Apr. 14, 2011

(51) Int. Cl.
*B23C 1/06* (2006.01)
*B23C 1/14* (2006.01)
*B23Q 11/00* (2006.01)

(52) U.S. Cl. ........ 409/137; 409/198; 409/221; 409/235; 29/DIG. 61; 29/DIG. 102; 29/27 R (58) Field of Classification Search ......... 409/168, 409/167, 165, 235, 198, 224, 227, 221, 137, 409/134; 29/27 R, 27 C, DIG. 94, DIG. 102, 29/DIG. 61; 408/71, 234; 483/18; 82/901
See application file for complete search history.

(56) References Cited

U.S. PATENT DOCUMENTS

| | | | |
|---|---|---|---|
| 4,088,164 A * | 5/1978 | McCord, Jr. | 409/137 |
| 4,730,373 A * | 3/1988 | Senoh | 29/26 A |
| 5,486,151 A * | 1/1996 | Bergmann et al. | 483/1 |
| 5,586,848 A * | 12/1996 | Suwijn | 409/137 |
| 5,727,296 A * | 3/1998 | Kobler | 29/27 C |
| 5,993,124 A * | 11/1999 | Cooper et al. | 409/137 |
| 6,299,393 B1 * | 10/2001 | Anders | 409/131 |
| 6,387,026 B1 * | 5/2002 | Schweizer et al. | 483/55 |
| 6,796,012 B2 * | 9/2004 | Geissler et al. | 29/27 C |
| 7,442,154 B2 * | 10/2008 | Boehler et al. | 483/50 |
| 2004/0102297 A1 * | 5/2004 | Quak et al. | 483/56 |
| 2005/0271488 A1 * | 12/2005 | Liechti et al. | 409/221 |
| 2008/0175684 A1 * | 7/2008 | Schmidt et al. | 409/211 |

FOREIGN PATENT DOCUMENTS

JP    2010-052068 A * 3/2010

* cited by examiner

*Primary Examiner* — Erica E Cadugan (57) ABSTRACT

A multi-spindle machining machine comprises a base including a working room to move a tool and a workpiece; a working head including a driving spindle disposed on a lower end thereof to clamp the tool; a carrier including a seat fixed on one side of the working room, a rotary shaft mounted on the seat laterally to drive the seat to rotate in an axial direction, a fixing holder connected to the rotary shaft to fix the workpiece to the fixing holder; a lateral driving device disposed on the base and located on one side of the working room in a horizontal direction to drive the working head to move in X and Y axes; a vertical driving device disposed on the base and located on another side of the working room in a lateral direction to drive the seat to move in Z axis direction.

15 Claims, 8 Drawing Sheets

MULTI-SPINDLE MACHINING MACHINE

BACKGROUND OF THE INVENTION

1. Field of the Invention

The present invention relates to an automatic machining machine, and more particularly to a multi-spindle machining machine which can lower size and production cost.

2. Description of the Prior Art

Conventional lateral driving device of a machining machine is disposed on one side of a working room, and a vertical driving device is fixed on the lateral device so that a working head move along X axis by using the working head and along Y axis by using the vertical driving device. However, such a machining machine has a large size to increase production cost.

Another conventional lateral device of a machining machine is fixed on a lower side of a working room, and a vertical driving device is mounted on an upper or lower sides so that the lateral driving device carries a workpiece on a carrier to move along X and Y axes, and the vertical driving device drives the carrier or a working head to move along a Z axis. However, such a machining machine is in a large size to increase production cost.

The present invention has arisen to mitigate and/or obviate the afore-described disadvantages.

SUMMARY OF THE INVENTION

The primary object of the present invention is to provide a multi-spindle machining machine which can lower size and production cost.

A multi-spindle machining machine in accordance with a preferred embodiment of the present invention comprises:

a base including a working room to move and rotate a tool and a workpiece;

a working head including a driving spindle to rotably disposed on a lower end thereof, and the lower end of the driving spindle clamping the tool;

a carrier including a seat, a rotary shaft, and a fixing holder, the seat being fixed on one side of the working room, the rotary shaft mounted on the seat laterally and allowing to drive the seat to rotate in an axial direction (A axis), the fixing holder connected to an end portion of the rotary shaft so that the workpiece is fixed to the fixing holder;

a lateral driving device disposed on the base and located on one side of the working room in a horizontal direction to drive the working head to move in an X axis and a Y axis at the working room;

a vertical driving device disposed on the base and located on another side of the working room in a lateral direction to drive the seat to move in Z axis direction.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Referring to FIGS. 1-4, a multi-spindle machining machine in accordance with a preferred embodiment of the present invention comprises a base 1, a working head 2, a carrier 3, a lateral driving device 4, and a vertical driving device 5, wherein the base 1 includes a working room 10 to move and rotate a tool 11 and a workpiece 12, the tool 11 is a milling cutter, a drill, and a grinding cutter, etc.

The working head 2 includes a driving spindle 20 to rotably disposed on a lower end thereof, and the lower end of the driving spindle 20 clamps the tool 11 to have a cutting, drilling, and grinding process.

The carrier 3 includes a seat 30, a rotary shaft 31, and a fixing holder 32. The seat 30 is fixed on one side of the working room 10. The rotary shaft 31 is mounted on the seat 30 laterally and allows to drive the seat 30 to rotate in an axial direction (A axis) by using a pneumatic cylinder or servo motor. The fixing holder 32 includes a lateral shank 33 and two positioning rods 34, the lateral shank 33 is connected to the rotary shaft 31, and the two positioning rods 34 vertically extend from two ends of the lateral shank 33 to fix the workpiece 12 thereon, and upper and lower opposite sides of the workpiece 12 are located between the two positioning rods 34. The fixing holder 32 is designed to include different structures based on the workpiece 12. For example, the fixing holder 32 is designed to include an annular fixing casing to match with a circular workpiece 12, and the fixing holder 32 is designed to include a fixing paw or sleeve to engage or insert a cylinder workpiece 12.

The lateral driving device 4 is disposed on the base 1 and located on one side of the working room 10 in a horizontal direction to drive the working head 2 to move in an X axis and a Y axis at the working room 10.

The vertical driving device 5 is disposed on the base 1 and located on another side of the working room 10 in a lateral direction to drive the seat 30 to move in Z axis direction.

Figure 1:
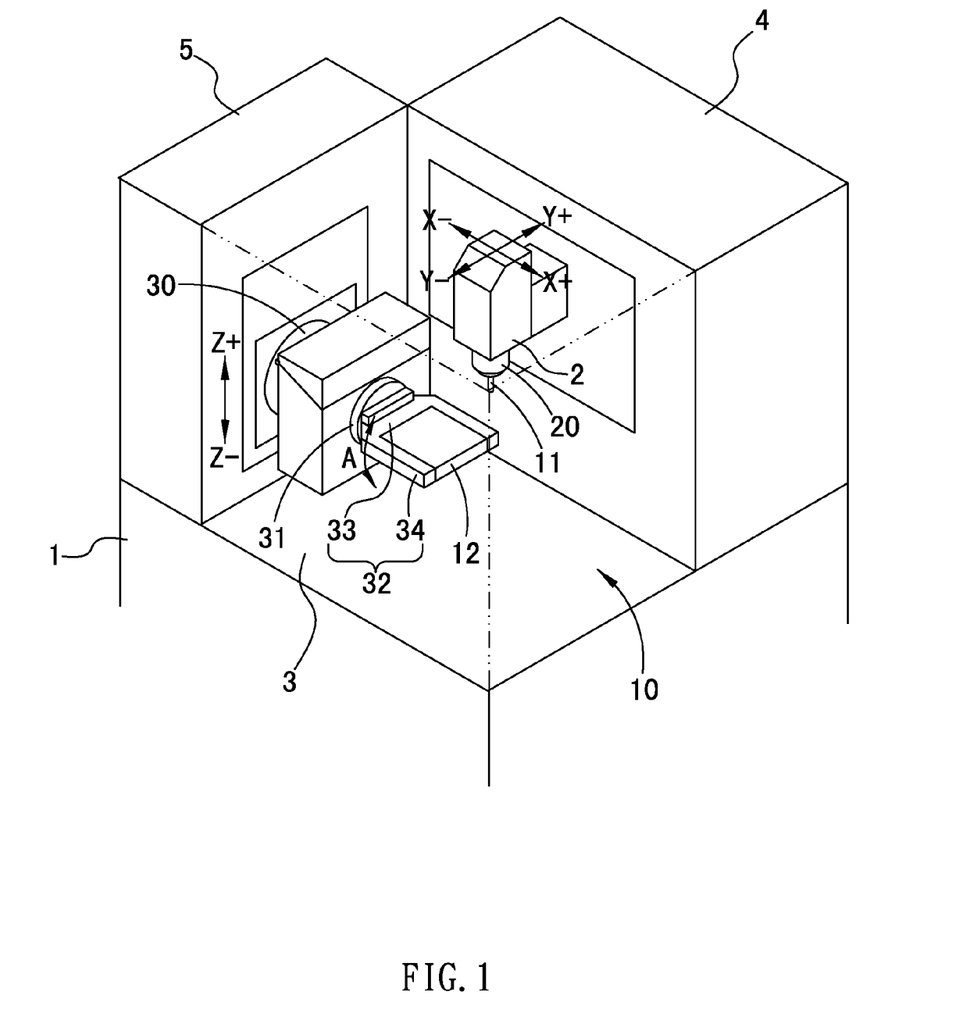
FIG. 1 is a perspective view showing the assembly of a multi-spindle machining machine in accordance with a preferred embodiment of the present invention.
Figure 2:
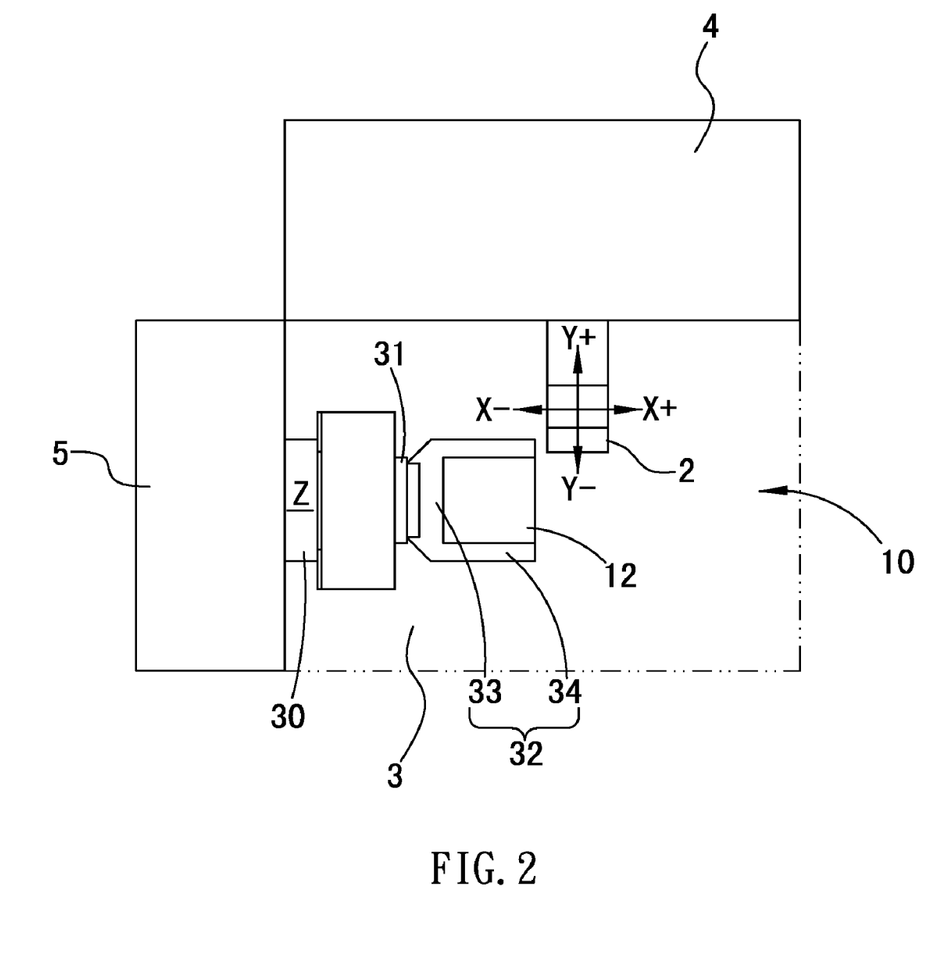
FIG. 2 is a plan view of the multi-spindle machining machine in accordance with the preferred embodiment of the present invention.
Figure 3:
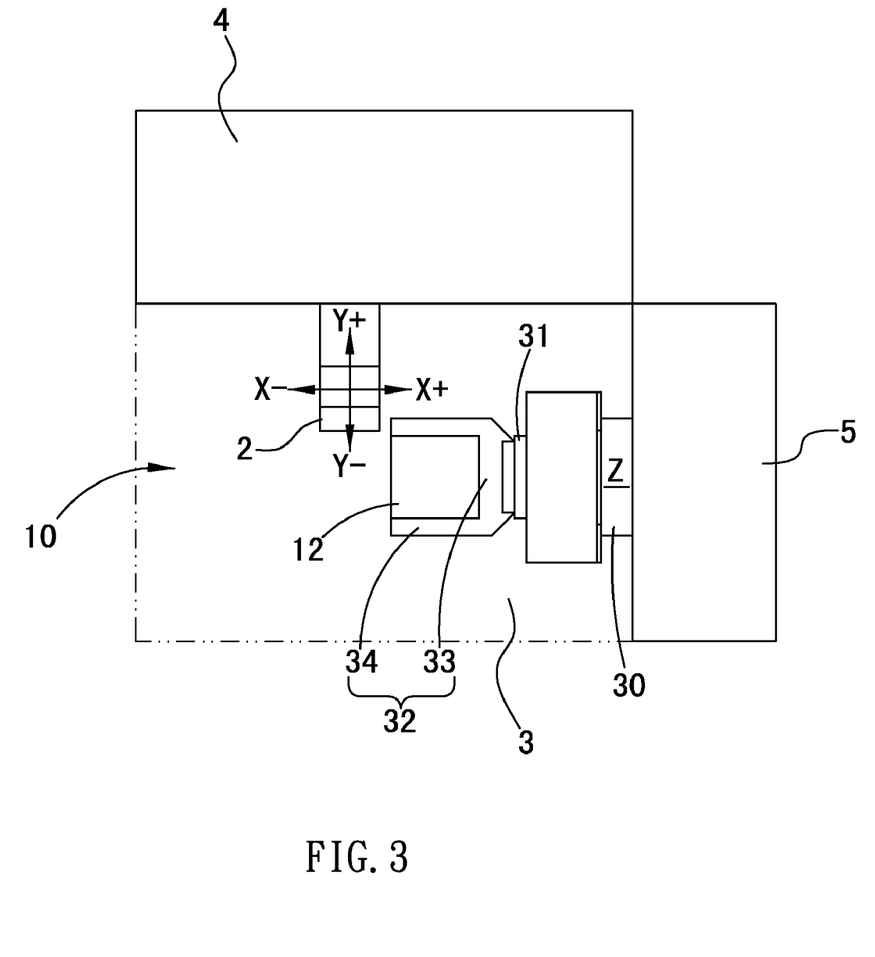
FIG. 3 is another plan view of the multi-spindle machining machine in accordance with the preferred embodiment of the present invention.
Figure 4:
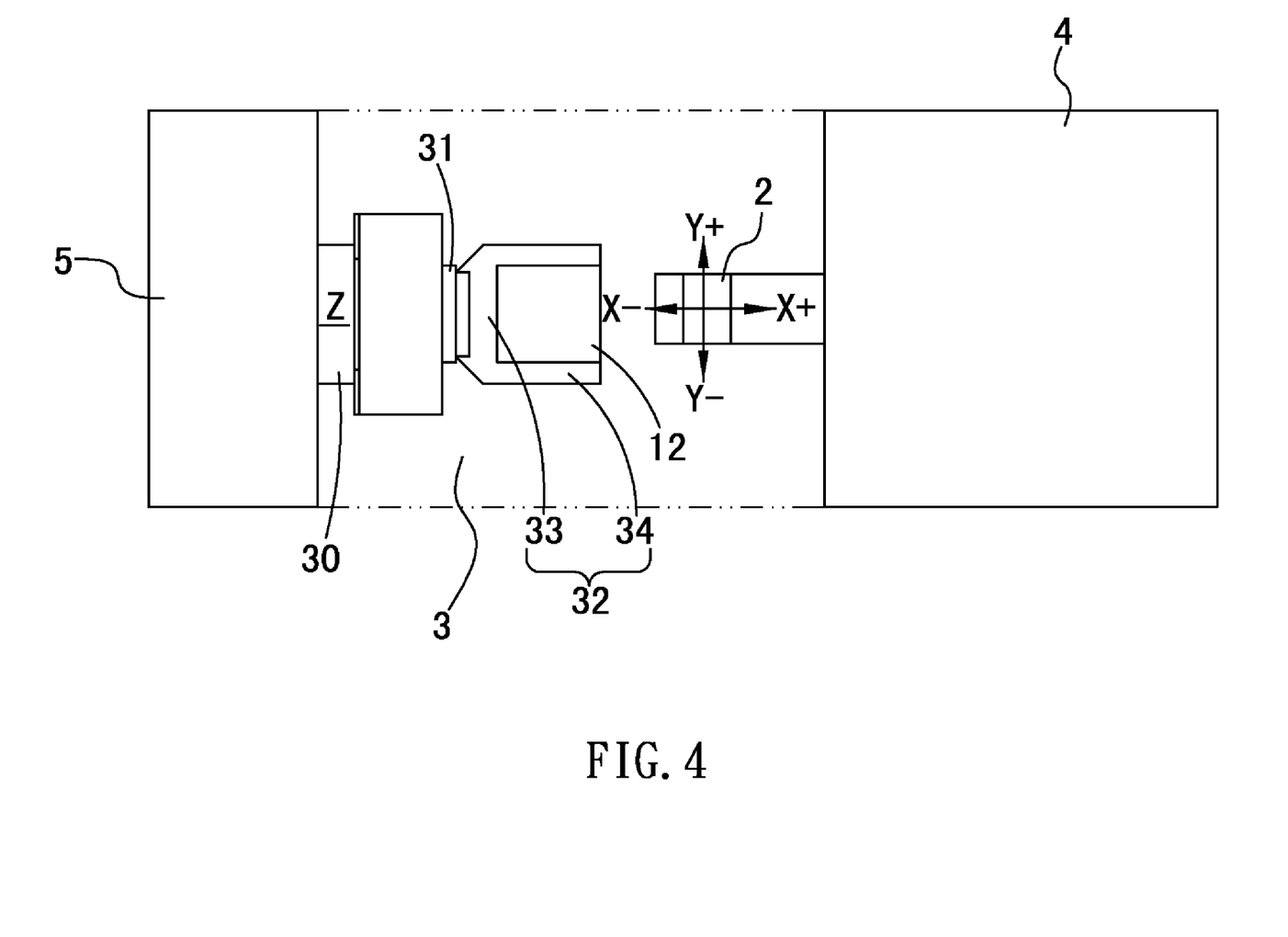
FIG. 4 is another plan view of the multi-spindle machining machine in accordance with the preferred embodiment of the present invention.

The lateral and vertical driving devices 4, 5 are located on two lateral sides of the working room 10, such as back and right sides of the working room 10 as shown in FIGS. 1 and 2, back and left sides of the working room 10 as shown in FIG. 3. Furthermore, the lateral and vertical devices 4, 5 are secured on two opposite sides in a lateral direction of the working room 10, left and right sides of the working room 10 as shown in FIG. 4, or front and rear sides of the working room 10 (not shown).

Therefore, the multi-spindle machining machine of the present invention includes the following advantages:

1. Lowering size, wherein the vertical driving device 5 drives the carrier 3 to move vertically, and the lateral driving device 4 only allows to drive a small size of working head 2 so as to move frontward and backward, leftward and rightward to work the workpiece 12, such that a largest moving travel of the working head 2 is designed to have a predetermined area matching with the size of the workpiece 12, decreasing size of the multi-spindle machining machine. Besides, the carrier 3 is designed to have a predetermined height to match with a working depth of the workpiece 12, therefore a vertical moving distance is equal to a thickness of the workpiece 12, and the carrier 3 can rotate the workpiece 12, such that the size of the multi-spindle machining machine is saved. Also, the lateral and the vertical driving devices 4, 5 are disposed in a lateral direction of the working room 10 to decrease height of the multi-spindle machining machine.

2. Decreasing production cost, wherein the vertical driving device 5 is fixed on a lateral position outside the lateral driving device 4 so as to assemble the multi-spindle machining machine easily and simplify structure.

3. Facilitating double-side working of the workpiece, wherein the rotary shaft 31 of the carrier 3 rotates to actuate the workpiece 21 on the fixing holder 32 to rotate so as to facilitate the three-dimensional and double-side working of the workpiece 12.

Figure 5:
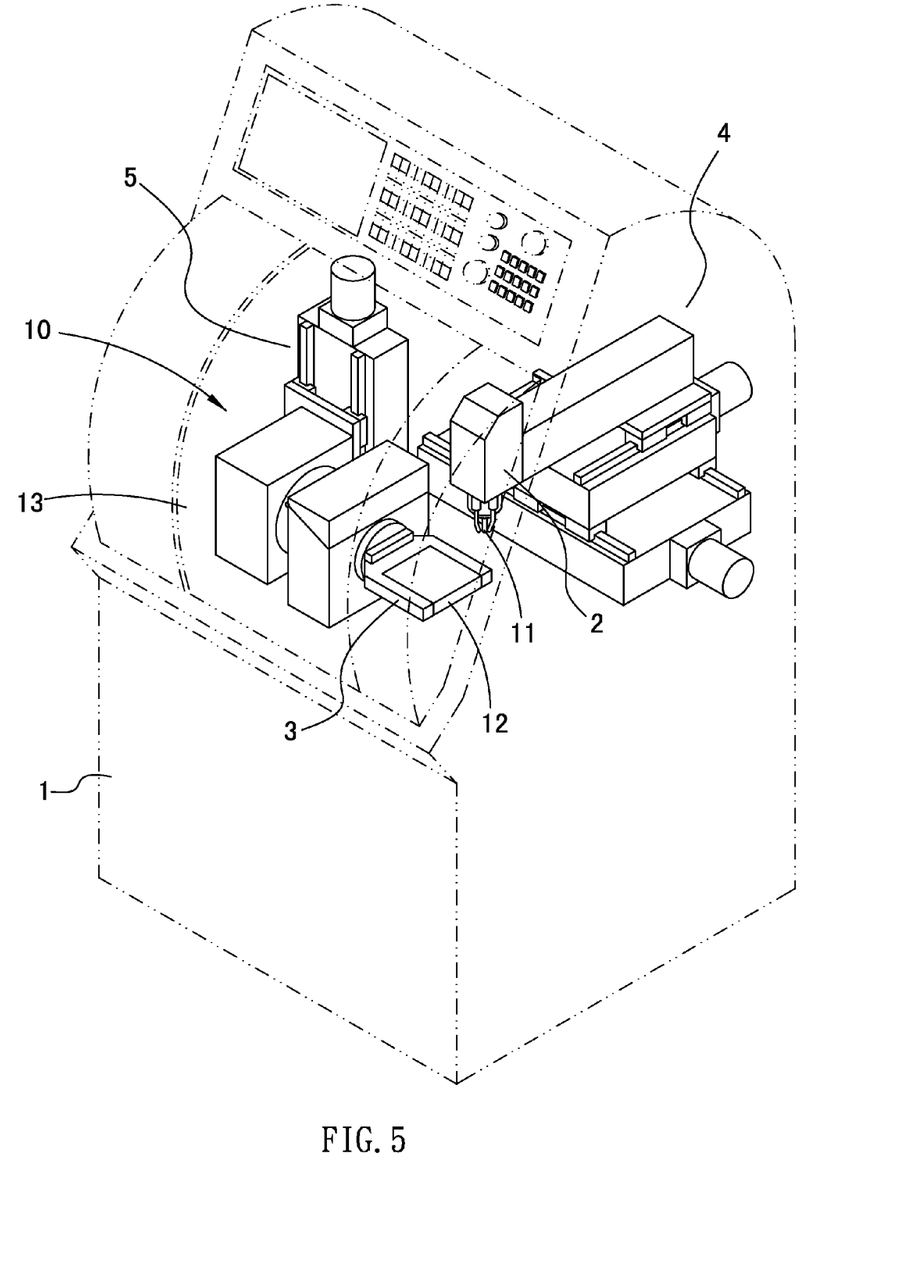
FIG. 5 is a perspective view showing the assembly of the multi-spindle machining machine in accordance with the preferred embodiment of the present invention.

Referring to FIG. 5, the working room 10 includes a chamber with a suitable length, width, and height. The lateral driving device 4 is located on a back side of the chamber, and the vertical driving device 5 is located on a left side of the chamber. The chamber includes a rotary transparent cover 13 therein to monitor a working status of the chamber and to install or remove the workpiece 12.

Figure 6:
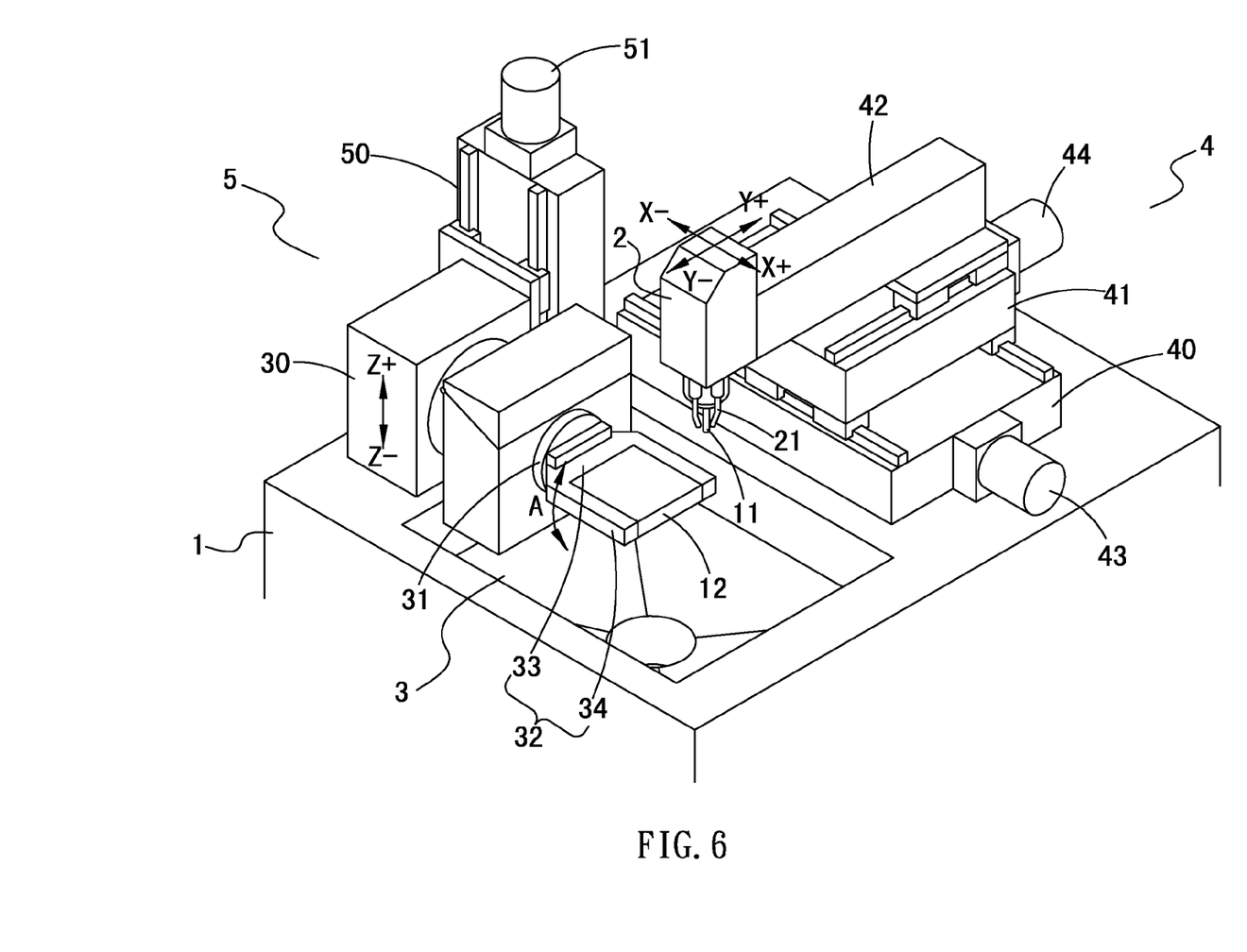
FIG. 6 is an amplified view of lateral and vertical driving devices of the multi-spindle machining machine in accordance with the preferred embodiment of the present invention.

As shown in FIG. 6, the lateral driving device 4 includes a first guiding member 40, a second guiding member 41, a working mount 42, a first diver 43, and a second driver 44. The first guiding member 40 is disposed on the base 1, and the second guiding member 41 is mounted on the first guiding member 40 to move along an X axis. The working mount 42 is secured on the second guiding seat 41 to move alone a Y axis, and the first driver 43 is a servo motor and disposed on the first guiding member 40 to drive the second guiding member 41 to move. The second driver 44 is a servo motor and fixed on the second guiding member 41 to drive the working mount 42 to move. The working head 2 is connected to the working mount 42.

The vertical driving device 5 includes a third guiding member 50 and a third driver 51, the third guiding member 50 is disposed on the base 1, the seat 30 of the carrier 3 is fixed on the third guiding member 50 to move along a Z axis, and the third driver 51 is disposed on the third guiding member 50 to drive the seat to move.

With reference to FIG. 6, the working head 2 includes at least one nozzle 21 to spray cutting oil or air.

Figure 7:
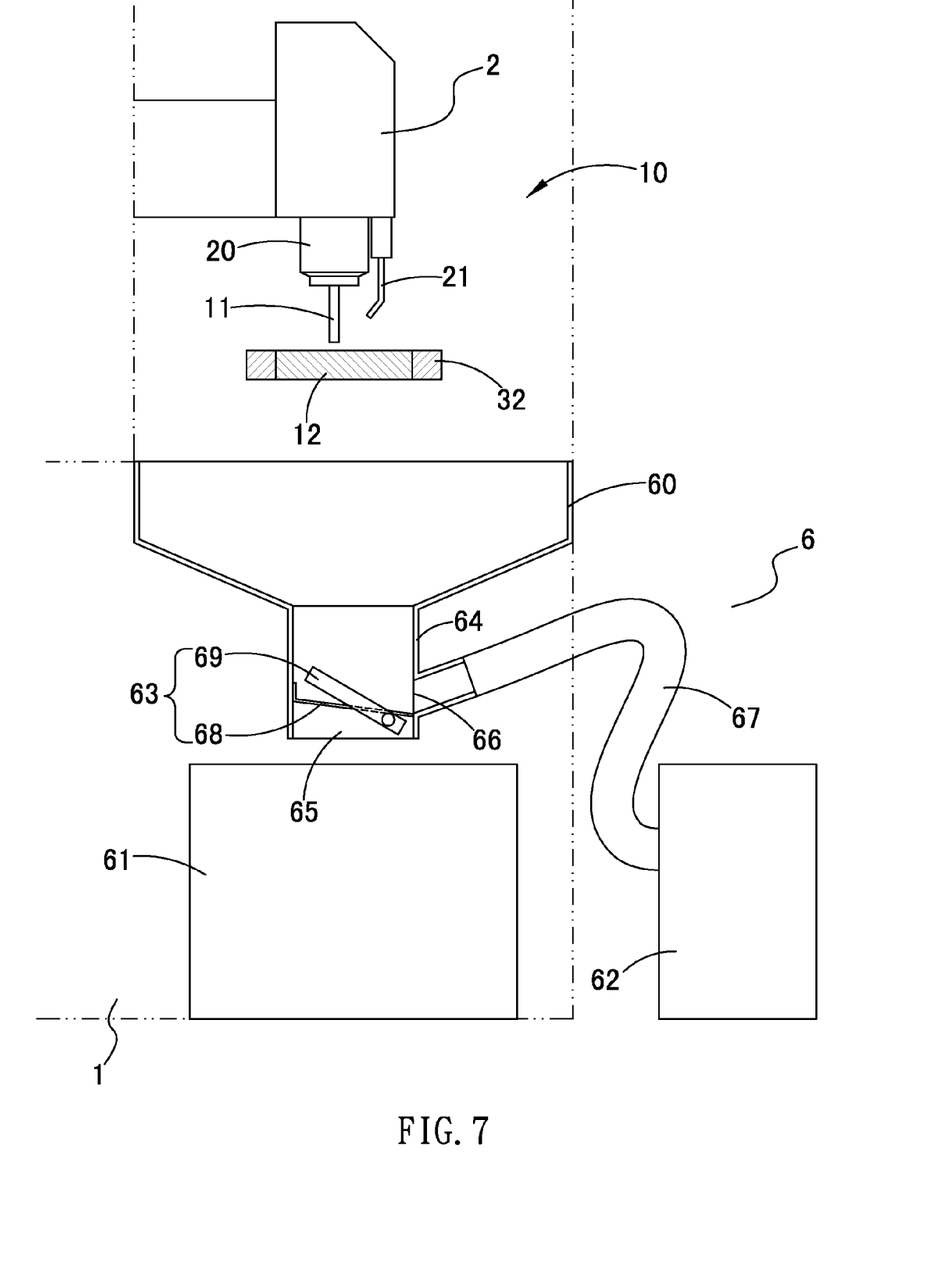
FIG. 7 is a plan view showing the operation of the multi-spindle machining machine in accordance with the preferred embodiment of the present invention.
Figure 8:
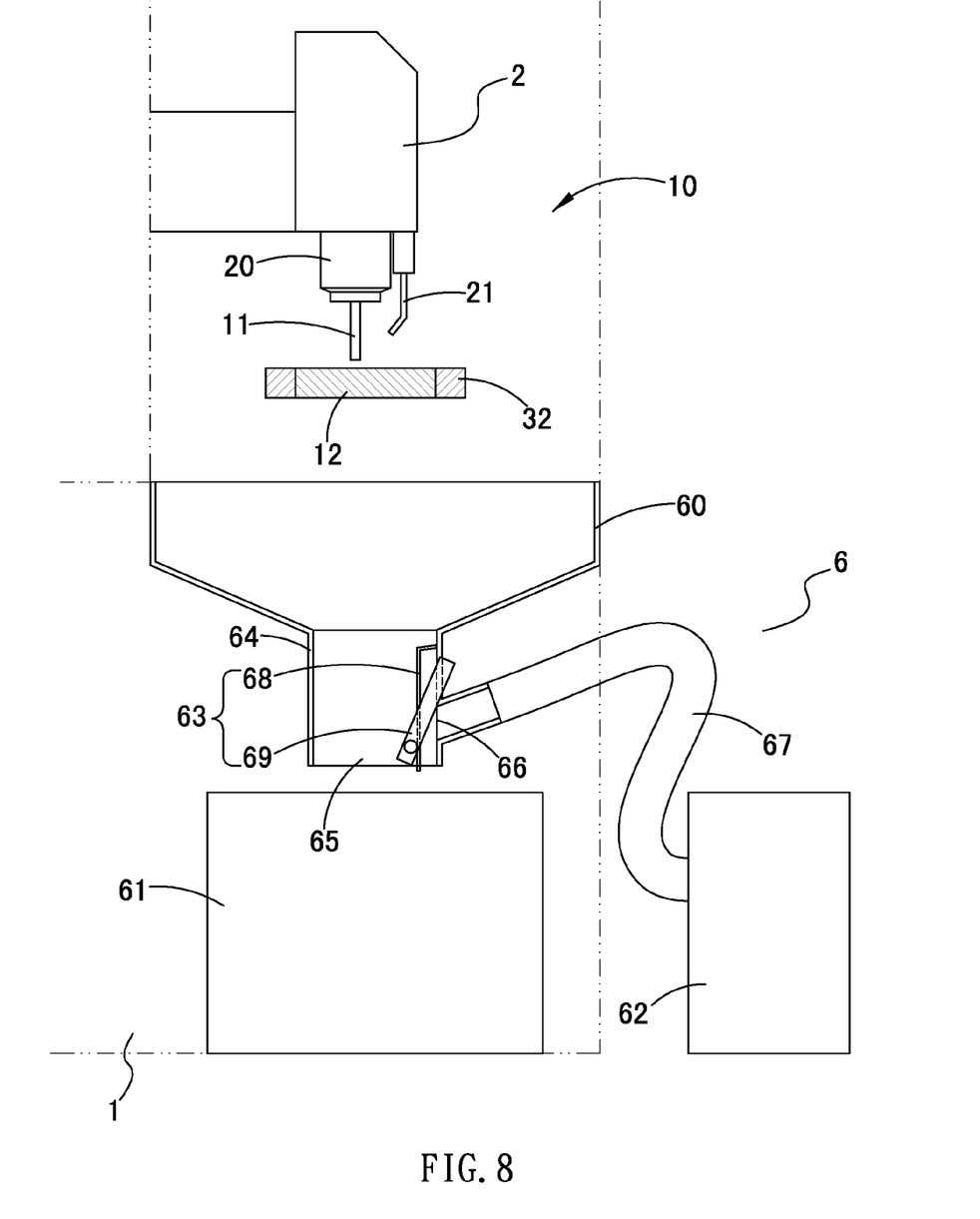
FIG. 8 is another plan view showing the operation of the multi-spindle machining machine in accordance with the preferred embodiment of the present invention.

With reference to FIGS. 7 and 8, the working room 10 of the base 1 includes a dust collecting mechanism 6 disposed on a lower side thereof to collect clips and cutting oil sprayed from the nozzle 21. The dust collecting mechanism 6 includes a groove 60, a tank 61, a dust collector 62, and a switching device 63, wherein the groove 60 is disposed below the working room 10 of the base 1, and is formed in a funnel shape to receive the clips and cutting oil falling from the working room 10. The groove 60 includes a pipe 64 communicating therewith and having a first outlet 65 mounted on a bottom portion of the pipe 64 and having a second outlet 66 fixed on a wall of the pipe 64.

The tank 61 is located below the first outlet 65 to receive the cutting oil falling from the first outlet 65.

The dust collector 62 is coupled to the second outlet 66 by using a connecting tube 67 to draw the chips from the pipe 64.

The switching 63 includes a plate member 68 and a controlling stem 69, the plate member 68 is mounted in the pipe 64 to swing to cover the first outlet 65 and the second outlet 66. The controlling stem 69 is mounted on an outer portion of the pipe 64 to drive the plate member 68 to swing.

Referring to FIG. 7, as the controlling stem 69 drives the plate member 68 to cover the first outlet 65, the dust collector 62 is started to draw wind and control the nozzle 21 to stop spraying cutting oil, having a dry cutting process.

As illustrated in FIG. 8, when the controlling stem 69 drives the plate member 68 to cover the second outlet 66, the dust collector 62 is closed automatically to control the nozzle 21 to spray cutting oil, having a wet cutting process.

While we have shown and described various embodiments in accordance with the present invention, it is clear to those skilled in the art that further embodiments may be made without departing from the scope of the present invention.

What is claimed is:

1. A machining machine comprising:
   a base including a working room in which to move and rotate a tool and a workpiece;
   a working head including a driving spindle rotatably disposed on a lower end of the working head, for rotating the tool, and a lower end of the driving spindle clamping the tool;
   a carrier including a seat configured to move relative to the base in a vertical Z-axis direction, a rotary shaft, and a fixing holder, the seat being fixed on one side of the working room, the rotary shaft mounted on the seat so as to project laterally with respect to the Z-axis along an A-axis and the rotary shaft being configured to be driven relative to the seat to rotate about the A axis, the fixing holder being connected to an end portion of the rotary shaft so that the workpiece is fixed to the fixing holder;
   a lateral driving device disposed on the base and located on one side of the working room spaced in a horizontal direction from the carrier in order to drive the working head to move in an X axis and a Y axis that are orthogonal to the Z axis;
   a vertical driving device disposed on the base and located on a side of the working room spaced from the working head in a horizontal direction and configured to drive the seat to move in the Z axis direction;
   wherein the machining machine further includes a dust collecting mechanism disposed on a lower side thereof to collect chips produced from machining the workpiece with the tool, the dust collecting mechanism includes a groove, a tank, a suction device for collecting dust, and a switching device, wherein the groove is disposed below the working room, and is formed in a funnel shape to receive the chips falling from the working room, wherein the groove is in operative communication with a pipe that has a first outlet configured to route the chips to the tank and that has a second outlet configured to route the chips to the suction device, and wherein the switching device is operable to pivot relative to the pipe to selectively close the first outlet to route the chips to the suction device via the second outlet and to pivot relative to the pipe to alternatively selectively close the second outlet to route the chips to the tank via the first outlet.

2. The machining machine as claimed in claim 1, wherein the lateral driving device and the vertical driving device are located on two abutting sides of the working room.

3. The machining machine as claimed in claim 2, wherein the lateral driving device includes a first guiding member, a second guiding member, a working mount, a first driver, and a second driver, the first guiding member is disposed on the base, and the second guiding member is mounted on the first guiding member to move along the X axis, the working mount is secured on the second guiding member to move along the Y axis, and the first driver is disposed on the first guiding member to drive the second guiding member to move, the second driver is fixed on the second guiding member to drive the working mount to move, and the working head is connected to the working mount;

the vertical driving device includes a third guiding member and a third driver, the third guiding member is disposed on the base, the seat of the carrier is fixed on the third guiding member to move along the Z axis, and the third driver is disposed on the third guiding member to drive the seat to move.

4. The machining machine as claimed in claim 3, wherein the working head includes at least one nozzle to spray cutting oil or air, and wherein the first outlet is mounted on a bottom portion of the pipe and the second outlet is fixed on a wall of the pipe.

5. The machining machine as claimed in claim 4, wherein as a controlling stem of the switching device is operated to drive a plate member to cover the first outlet, the suction device is started to draw wind and the nozzle is controlled to stop spraying cutting oil.

6. The machining machine as claimed in claim 2, wherein the fixing holder includes a shank and two positioning rods, the shank is connected to the rotary shaft, and the two positioning rods extend orthogonally from two ends of the shank to fix the workpiece on the fixing holder.

7. The machining machine as claimed in claim 1, wherein the lateral driving device and the vertical driving device are located on two opposite sides of the working room.

8. The machining machine as claimed in claim 7, wherein the lateral driving device includes a first guiding member, a second guiding member, a working mount, a first driver, and a second driver, the first guiding member is disposed on the base, and the second guiding member is mounted on the first guiding member to move along the X axis, the working mount is secured on the second guiding member to move along the Y axis, and the first driver is disposed on the first guiding member to drive the second guiding member to move, the second driver is fixed on the second guiding member to drive the working mount to move, and the working head is connected to the working mount;

the vertical driving device includes a third guiding member and a third driver, the third guiding member is disposed on the base, the seat of the carrier is fixed on the third guiding member to move along the Z axis, and the third driver is disposed on the third guiding member to drive the seat to move.

9. The machining machine as claimed in claim 8, wherein the working head includes at least one nozzle to spray cutting oil or air, and wherein the first outlet is mounted on a bottom portion of the pipe and the second outlet is fixed on a wall of the pipe.

10. The machining machine as claimed in claim 9, wherein as a controlling stem of the switching device is operated to drive a plate member to cover the first outlet, the suction device is started to draw wind and the nozzle is controlled to stop spraying cutting oil.

11. The machining machine as claimed in claim 7, wherein the fixing holder includes a shank and two positioning rods, the shank is connected to the rotary shaft, and the two positioning rods extend orthogonally from two ends of the shank to fix the workpiece on the fixing holder.

12. The machining machine as claimed in claim 1, wherein the lateral driving device includes a first guiding member, a second guiding member, a working mount, a first driver, and a second driver, the first guiding member is disposed on the base, and the second guiding member is mounted on the first guiding member to move along the X axis, the working mount is secured on the second guiding member to move along the Y axis, and the first driver is disposed on the first guiding member to drive the second guiding member to move, the second driver is fixed on the second guiding member to drive the working mount to move, and the working head is connected to the working mount;

the vertical driving device includes a third guiding member and a third driver, the third guiding member is disposed on the base, the seat of the carrier is fixed on the third guiding member to move along the Z axis, and the third driver is disposed on the third guiding member to drive the seat to move.

13. The machining machine as claimed in claim 12, wherein the working head includes at least one nozzle to spray cutting oil or air, and wherein the first outlet is mounted on a bottom portion of the pipe and the second outlet is fixed on a wall of the pipe.

14. The machining machine as claimed in claim 13, wherein as a controlling stem of the switching device is operated to drive a plate member to cover the first outlet, the suction device is started to draw wind and the nozzle is controlled to stop spraying cutting oil.

15. The machining machine as claimed in claim 1, wherein the fixing holder includes a shank and two positioning rods, the shank is connected to the rotary shaft, and the two positioning rods extend orthogonally from two ends of the shank to fix the workpiece on the fixing holder.

\* \* \* \* \*